W. L. BLISS.
TRAIN LINE COUPLING.
APPLICATION FILED NOV. 28, 1904.

910,040.

Patented Jan. 19, 1909.

WITNESSES:
Herbert J. Smith
Edwin B. H. Tower, Jr.

INVENTOR
William L. Bliss.
BY Jones & Addington
ATTORNEYS

UNITED STATES PATENT OFFICE.

WILLIAM L. BLISS, OF BROOKLYN, NEW YORK.

TRAIN-LINE COUPLING.

No. 910,040.　　　Specification of Letters Patent.　　　Patented Jan. 19, 1909.

Application filed November 28, 1904. Serial No. 234,563.

*To all whom it may concern:*

Be it known that I, WILLIAM L. BLISS, a citizen of the United States, residing at Brooklyn, in the county of Kings and State of New York, have invented new and useful Improvements in Train-Line Couplings, of which the following is a full, clear, concise, and exact description, reference being had to the accompanying drawing, forming a part of this specification.

The present invention relates to improvements in couplings for electrical train lines.

Throughout railroad trains, there usually extend train lines, such as pipe lines and electric lines. These lines are composed of sections, a section being carried upon each car or unit in the train. The pipe line is usually employed for conducting fluid under pressure throughout the train. The sections of the pipe line are provided at each end with a coupling member or head by which the sections of the pipe line are connected together to form the train line.

The present invention has for an object thereof to employ the coupling members of the pipe line for connecting the sections of an electric line.

The present invention also has for an object thereof to provide means for disconnecting the sections of the electric line from the coupling members of the pipe line.

The apparatus illustrated in the accompanying drawings will serve to explain the invention.

It will of course be understood that the invention may be embodied in various other forms, and that it may be employed for various purposes.

Figure 1:
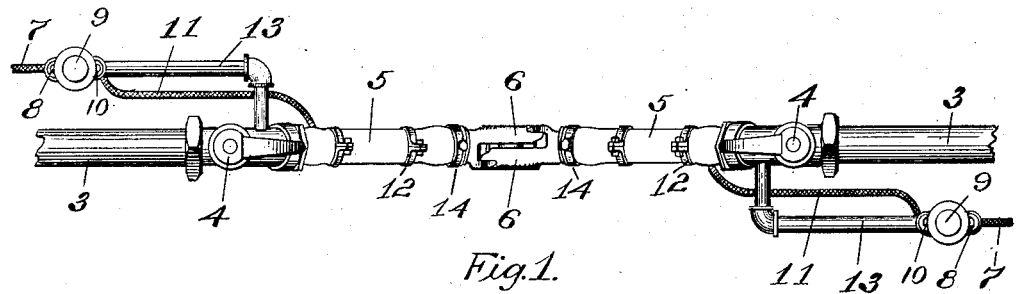
Figure 2:
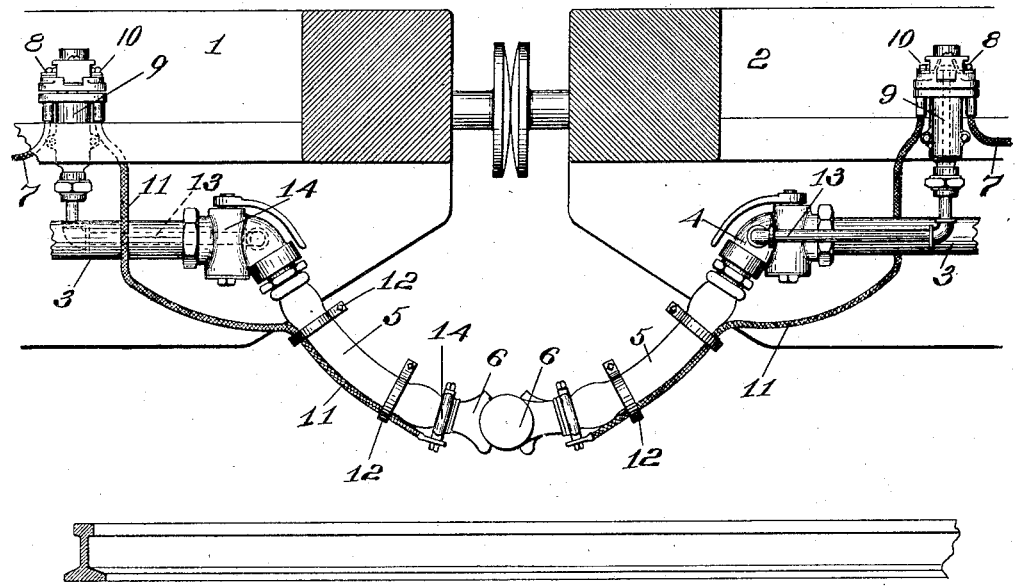
Figures 3, 4:
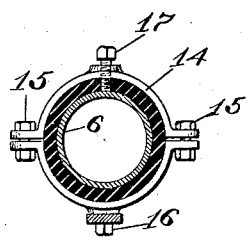

The views in the accompanying drawings are as follows:

Figure 1 is a plan view of two sections of the pipe line and two sections of the electric line which are connected together by the coupling. Fig. 2 is a side view of the ends of two cars showing the section of the pipe line and an electric line connected together by the coupling. Fig. 3 is an enlarged view of one of the coupling members, and, Fig. 4 is a transverse sectional view on the line 4—4 of Fig. 3.

The cars 1 and 2 are each provided with a section 3 of the air pipe line which extends through the train, the ends of each section of the pipe line being provided with an angle cock 4, which has a hose 5 connected thereto. The hose carries at the outer end thereof a coupling head or member 6, generally made of metal or other conducting material. The cars 1 and 2 are also each provided with a cable or conductor 7, said cable being connected to the terminal 8 of a fluid-pressure operated switch 9. The other terminal 10 of said switch has a cable or conductor 11 connected thereto, the outer end of said cable being arranged alongside the hose 5 and fastened thereto by straps 12. The operating mechanism of the switch is preferably connected to the outer end of the angle cock 4 by a pipe 13. The switch may be of the form indicated in the Letters Patent granted upon August 4, 1903, No. 735,452, or of any other form.

The hose 5 may be clamped to the coupling head or member 6 by a strap 14, this strap being made in two sections which are fastened together by bolts 15. The outer end of the cable 11 may be connected to the strap 14 by a binding screw 16, and said strap may be electrically connected to the coupling head or member 6 by a screw or bolt 17 which is threaded in said strap. The screw 17 passes through the hose 5 and engages the coupling member. The hose 5 being composed of insulating material, the coupling head or member is insulated from the section 3 of the pipe line.

The coupling members 6 at the adjacent ends of the sections of the train line are adapted to be coupled to connect the sections of the electric line and the pipe line. The angle cocks 4 are usually open to permit air, steam or other fluids to pass through the pipe line. The fluid in said pipe line passes through the pipes 13 to the operating mechanisms of the switches. When the fluid under pressure enters the operating mechanisms of the switches, the switches are closed and connect the cables 7 and 11. It is customary to close the angle cocks when the sections of the train line are disconnected. The pressures in the operating mechanisms being relieved when the coupling members of the train line are uncoupled, the switches will be open and will disconnect the cables 7 and 11. The coupling members are usually placed upon dummies or hangers when the same are uncoupled, but sometimes each member swings about on the hose by which it is carried. In either instance, the sections of the electric line will not become grounded if the coupling members engage parts which are grounded, as the circuit between the coupling members and the cables 7 is broken by the switches. If the pipes 3 be connected and the angle cocks be closed, as is some times the case where connected cars are out of service, the compressed air in the hose 5 will leak between the coupling members 6 until the pressure in the hose is relieved, and, in consequence, the switches 9 will be opened.

If the train is provided with an electric line which has the sections thereof connected by a special coupling, and it is necessary to extend a conductor through the train in addition to the conductors of said electric line, it being impractical to arrange said additional conductor in said electric line, the present invention may be employed advantageously.

It is obvious that many changes may be made in the system which has been particularly described herein for the purpose of disclosing the invention, which will be within the purview of the claims appended hereto.

Having thus described my invention, what I claim as new and desire to secure by Letters Patent is:

1. In a railroad train, in combination, a sectional pipe line passing through a plurality of units of the train, a coupling connecting sections of said line, a sectional electric line extending through said units of the train and having sections thereof connected by said coupling, and automatic means for disconnecting each section of said electric line from its corresponding members of said coupling.

2. In combination, a sectional pipe line which is adapted to contain fluid under pressure, a cock arranged upon the end of a section of said line and adapted to close the passage through the end of said section, a coupling member connected to said cock and adapted to be connected to a complementary coupling member having connection with another section of said line, so as to establish communication between said sections when said cock is open, a sectional electric line, a switch having electrical connections with a section of said electric line and the first mentioned coupling member whereby when said switch is closed, said section of said electric line is connected to said first mentioned coupling member, a fluid pressure operated mechanism adapted to operate said switch, said mechanism being connected to said cock at a point between said cock and said coupling member whereby said mechanism will receive fluid under pressure from said pipe line when said cock is open, to close said switch, and when the cock is closed the supply of fluid under pressure is cut off therefrom, to open said switch, thereby disconnecting said electric line from the first mentioned coupling member.

3. In combination, a sectional pipe line, a coupling member connected to a section of said pipe line, a sectional electric line having a section thereof electrically connected to said coupling member, and automatic means for disconnecting said section of said electric line from said coupling member.

4. In combination, a sectional pipe line, a hose connected to a section of said line, a coupling member carried by said hose, a sectional electric line having a section thereof electrically connected to said coupling member, and automatic means for disconnecting said section of said electric line from said coupling member.

5. In combination, a sectional pipe line, a hose connected to a section of said pipe line, a coupling member carried by said hose, a strap clamping said hose to said member, and a sectional electric line having a section thereof electrically connected to said strap, and means extending through said strap and hose to electrically connect said strap to said coupling member.

6. In a car, in combination, a pipe carried upon the car, a coupling member connected to said pipe, an electrical conductor electrically connected to said coupling member, and automatic means for disconnecting said conductor from said coupling member.

7. In a car, in combination, a pipe carried upon the car, a hose connected to said pipe, a coupling member carried by said hose, an electrical conductor electrically connected to said coupling and automatic means for disconnecting said conductor from said coupling member.

8. In a car, in combination, a pipe carried upon the car, a hose connected to said pipe, a coupling member carried by said hose, an electrical conductor electrically connected to said coupling, and automatic means for disconnecting said conductor from said coupling member.

9. In a car, in combination, a pipe carried upon the car, a cock connected to the end of said pipe, a hose attached to said cock, a coupling member carried by said hose, an electrical conductor connected to said coupling member, and a fluid-pressure operated switch having the fluid-pressure operated mechanism thereof connected to the outer end of said cock, said switch being adapted to disconnect said conductor from said coupling member.

10. In a car, in combination, a pipe carried by said car, an angle cock carried by said pipe, a coupling member connected to said angle cock, an electric conductor, a fluid-pressure-actuated switch adapted to connect said conductor to said coupling member and disconnect the same therefrom, the operating mechanism of said switch being in communication with the passage between said angle cock and said coupling member.

11. In a car, in combination, a pipe carried by said car, an angle cock carried by said pipe, a hose connected to said angle cock, a coupling member carried by said hose, an electric conductor, a fluid-pressure-actuated switch adapted to connect said conductor to said coupling member and disconnect the same therefrom, the actuating mechanism of said switch being in communication with the passage between said angle cock and said coupling member.

In witness whereof, I have hereunto subscribed my name in the presence of two witnesses.

WILLIAM L. BLISS.

Witnesses:
EDWIN B. H. TOWER, Jr.,
HERBERT J. SMITH.